US009785474B2

(12) United States Patent
Cropper et al.

(10) Patent No.: US 9,785,474 B2
(45) Date of Patent: Oct. 10, 2017

(54) MANAGING A SHARED POOL OF CONFIGURABLE COMPUTING RESOURCES USING A SET OF SCALING FACTORS AND A SET OF WORKLOAD RESOURCE DATA

(71) Applicant: International Business Machines Corporation, Armonk, NY (US)

(72) Inventors: Joseph W. Cropper, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/807,867

(22) Filed: Jul. 23, 2015

(65) Prior Publication Data

US 2017/0024255 A1    Jan. 26, 2017

(51) Int. Cl.
*G06F 9/50* (2006.01)

(52) U.S. Cl.
CPC .................................. *G06F 9/505* (2013.01)

(58) Field of Classification Search
None
See application file for complete search history.

(56) References Cited

U.S. PATENT DOCUMENTS

| 7,321,992 | B1 | 1/2008 | Vellore et al. |
| 8,140,816 | B2 | 3/2012 | Hofer et al. |
| 8,423,998 | B2 | 4/2013 | Isci et al. |
| 8,566,835 | B2 | 10/2013 | Wang et al. |
| 8,631,458 | B1 | 1/2014 | Banerjee |
| 8,756,609 | B2 | 6/2014 | Dasgupta et al. |
| 8,825,550 | B2 | 9/2014 | Marr et al. |
| 2006/0149695 | A1 | 7/2006 | Bossman et al. |
| 2006/0184937 | A1 | 8/2006 | Abels et al. |

(Continued)

FOREIGN PATENT DOCUMENTS

| CN | 103559072 A | 2/2014 |
| CN | 104038392 A | 9/2014 |

OTHER PUBLICATIONS

List of IBM Patents or Patent Applications Treated As Related.
(Continued)

*Primary Examiner* — Lewis A Bullock, Jr.
*Assistant Examiner* — Wynuel Aquino
(74) *Attorney, Agent, or Firm* — Robert J. Shatto

(57) ABSTRACT

Disclosed aspects manage a shared pool of configurable computing resources associated with a shared pool manager. The shared pool manager receives a set of scaling factors. The set of scaling factors corresponds to a workload. Using the set of scaling factor values and a set of workload resource data, a configuration is determined. The configuration is established to process the workload. Disclosed aspects manage a shared pool of configurable computing resources associated with a registry. The registry is structured to have a set of workload resource data and associated scaling factors. A set of scaling factor values is detected. The set of scaling factors corresponds to a workload. Based on both the set of workload resource data and the set of scaling factor values, a set of resource attributes is determined to configure the shared pool of configurable computing resources for the workload. The set of resource attributes is communicated.

8 Claims, 6 Drawing Sheets

(56) References Cited

U.S. PATENT DOCUMENTS

| | | | |
|---|---|---|---|
| 2006/0212746 A1* | 9/2006 | Amegadzie | G06F 17/30221 714/6.3 |
| 2007/0208844 A1 | 9/2007 | Armstrong et al. | |
| 2008/0168182 A1 | 7/2008 | Frank et al. | |
| 2008/0270693 A1 | 10/2008 | Jacobson et al. | |
| 2009/0070771 A1 | 3/2009 | Yuyitung et al. | |
| 2009/0217267 A1 | 8/2009 | Gebhart et al. | |
| 2009/0288084 A1* | 11/2009 | Astete | G06F 9/45533 718/1 |
| 2010/0050172 A1 | 2/2010 | Ferris | |
| 2010/0306163 A1 | 12/2010 | Beaty et al. | |
| 2010/0325132 A1* | 12/2010 | Liu | G06F 17/30516 707/759 |
| 2011/0302578 A1* | 12/2011 | Isci | G06F 9/5077 718/1 |
| 2012/0137002 A1 | 5/2012 | Ferris et al. | |
| 2012/0204187 A1 | 8/2012 | Breiter et al. | |
| 2013/0073601 A1 | 3/2013 | Jenkins et al. | |
| 2013/0097601 A1 | 4/2013 | Podvratnik et al. | |
| 2013/0124669 A1 | 5/2013 | Anderson et al. | |
| 2013/0174149 A1 | 7/2013 | Dasgupta et al. | |
| 2013/0185729 A1 | 7/2013 | Vasic et al. | |
| 2013/0318221 A1 | 11/2013 | Anaya et al. | |
| 2014/0040885 A1 | 2/2014 | Donahue | |
| 2014/0047443 A1* | 2/2014 | Mann | G06F 9/45533 718/1 |
| 2014/0082612 A1 | 3/2014 | Breitgand et al. | |
| 2014/0337832 A1 | 11/2014 | Adogla | |
| 2015/0112915 A1* | 4/2015 | Michael | G06N 5/04 706/46 |
| 2015/0366000 A1 | 12/2015 | Bedekar et al. | |
| 2017/0075727 A1 | 3/2017 | Cropper et al. | |
| 2017/0075728 A1 | 3/2017 | Cropper et al. | |

OTHER PUBLICATIONS

Cropper et al., "Managing a Shared Pool of Configurable Computing Resources Using a Set of Scaling Factors and a Set of Workload Resource Data", U.S. Appl. No. 14/834,384, filed Aug. 24, 2015.

Yazdanov, Lenar, et al., "Vscaler: Autonomic virtual machine scaling." Cloud Computing (Cloud), 2013 IEEE Sixth International Conference on. IEEE, 2013.

Guo, Yanfei, et al., "Coordinated VM Resizing and Server Tuning: Throughput, Power Efficiency and Scalability", 2012 IEEE 20th International Symposium on Modeling, Analysis and Simulation of Computer and Telecommunication Systems.

Tuczai, Eva, "Workload Rightsizing using the VMTurbo Economic Scheduling Engine", VMTurbo Product Forum, <https://greencircle.vmturbo.com/community/products/blog/2015/02/15/workload-rightsizing-and-vmturbo>.

List of IBM Patents or Patent Applications Treated as Related, Mar. 27, 2017, 2 pgs.

Mell, Peter, et al., The NIST Definition of Cloud Computing, National Institute of Standards and Technology, Oct. 7, 2009, Version 15, NIST, Gaithersburg, MD, US.

Wang, W. et al., An availability-aware virtual machine placement approach for dynamic scaling of cloud applications, 2012 9th International Conference on Ubiquitous Intelligence and Computing and 9th International Conference on Autonomic and Trusted Computing.

Liu, Z. et al., Workload-aware and CPU frequency scaling for optimal energy consumption in VM allocation, Mathematical Problems in Engineering, vol. 2014, Article ID 906098, 12 pages, <http://dx.doi.org/10.1155/2014/906098>.

Teng, F. et al., An Energy-Efficient VM Placement in Cloud Datacenter, IEEE, 2014.

Dynamic identification and pinning of workloads to certain physical servers to minimize placement entropy, IP.com, Feb. 26, 2014.

System and Apparatus for deploying workloads in Cloud based on Application Type and workloads relationships, IP.com, May 13, 2011.

List of IBM Patents or Patent Applications Treated as Related, May 23, 2017, 2 pgs.

Cropper et al., "Managing a Shared Pool of Configurable Computing Resources Using a Set of Scaling Factors and a Set of Workload Resource Data," U.S. Appl. No. 15/598,709, filed May 18, 2017.

Cropper et al., "Managing a Shared Pool of Configurable Computing Resources Using a Set of Scaling Factors and a Set of Workload Resource Data," U.S. Appl. No. 15/598,738, filed May 18, 2017.

* cited by examiner

MANAGING A SHARED POOL OF CONFIGURABLE COMPUTING RESOURCES USING A SET OF SCALING FACTORS AND A SET OF WORKLOAD RESOURCE DATA

BACKGROUND

This disclosure relates generally to computer systems and, more particularly, relates to managing a shared pool of configurable computing resources. The amount of data that needs to be managed by enterprises is increasing. Management of a shared pool of configurable computing resources may be desired to be performed as efficiently as possible. As data needing to be managed increases, the need for management efficiency may increase.

SUMMARY

Disclosed aspects manage a shared pool of configurable computing resources associated with a shared pool manager. The shared pool manager receives a set of scaling factor values. The set of scaling factors corresponds to a workload. Using the set of scaling factor values and a set of workload resource data, a configuration (for the shared pool of configurable computing resources) is determined. The configuration is established to process the workload.

Disclosed aspects manage a shared pool of configurable computing resources associated with a registry. The registry is structured to have a set of workload resource data for a set of scaling factors. Based on both the set of workload resource data and the set of scaling factor values, a set of resource attributes is determined to configure the shared pool of configurable computing resources for the workload. In response, the set of resource attributes is communicated.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
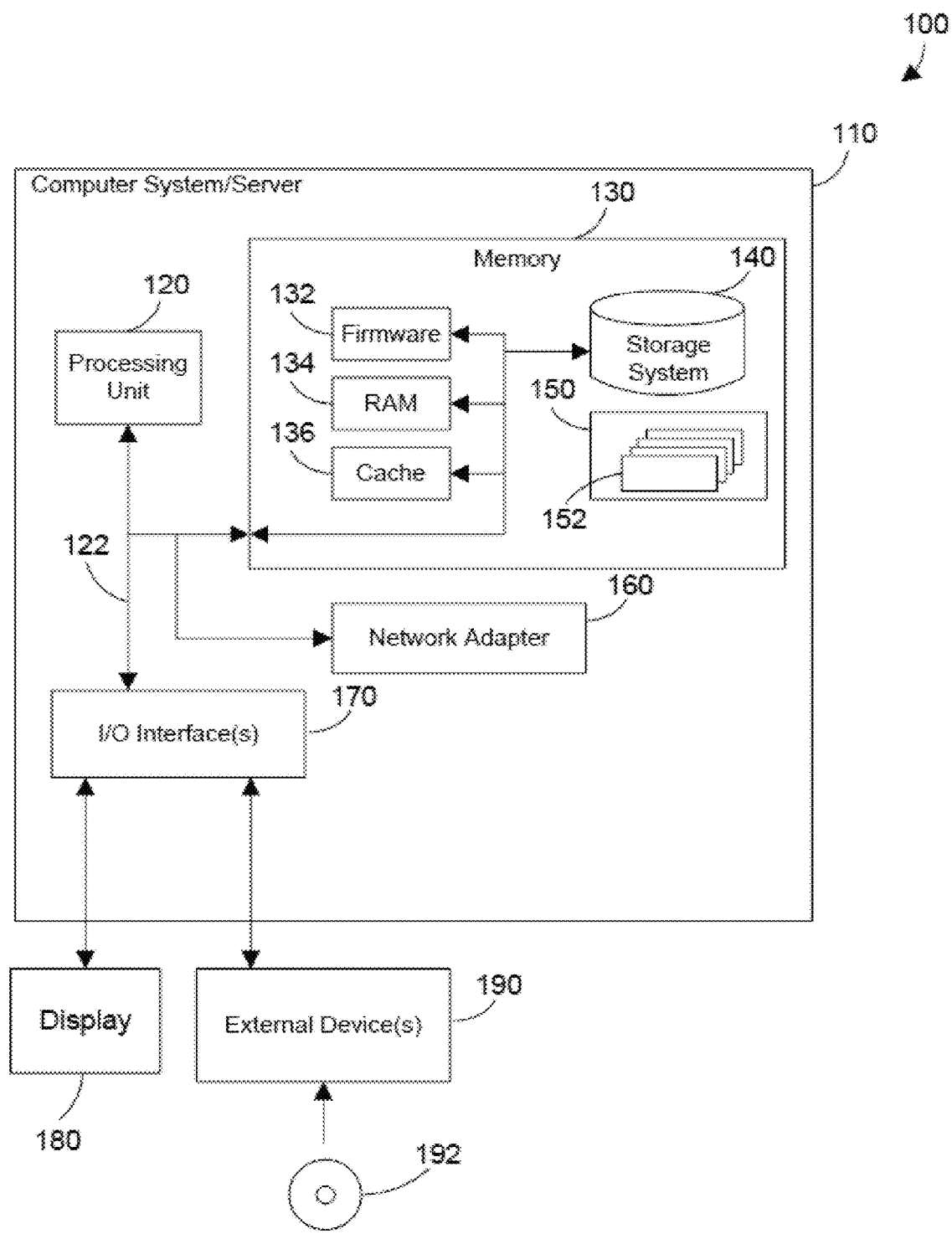
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure couple virtualization/cloud software for deploying virtual machines to hosts with scaling factors indicating resource requirements for features such as hardware components. Accordingly, a cloud environment configuration may be dynamically determined (e.g., without utilizing user intervention at the point of making the determination). Utilizing aspects of the disclosure, users may provide scaling factors values for the workload but may not need to understand the calculations which determine the proper size for their virtual machines.

Cloud management software may use templates/flavors to define a limited set of predefined resource configurations to ease in specifying the size of a virtual machine. It may then be the responsibility of the cloud administrator to work-out a portion of these templates for the various types of workloads to be run-on. Users may be faced with adjusting the values for individual virtual machines based on their own understanding of the workload and scale they intend to run. This can result in the users making decisions in areas they have little experience or in improperly sized virtual machines. As such, neither the cloud administrator nor cloud user may have appropriate information to efficiently determine resource requirements for the virtual machines for a given scale. Disclosed aspects may provide performance or efficiency benefits with respect to this characteristic.

Aspects of the disclosure include a method, system, and computer program product of managing a shared pool of configurable computing resources associated with a shared pool manager (e.g., cloud manager). The shared pool manager receives a set of scaling factor values (e.g. 500 transactions per day). The set of scaling factors corresponds to a workload. Using the set of scaling factors values, and a set of workload resource data, a configuration (for the shared pool of configurable computing resources) is determined. The configuration is established to process the workload (e.g., providing a memory/processing/disk resource, deploying/sizing/resizing a virtual machine).

Aspects of the disclosure include a method, system, and computer program product of managing a shared pool of configurable computing resources associated with a registry. The registry is structured to have a set of workload resource data for a set of scaling factors. In response to requests, the registry can communicate the list of scaling factors descriptions (e.g. "Transaction per day") for a workload. In addition, based on both the set of workload resource data and a set of values for the scaling factors, a set of resource attributes is determined to configure the shared pool of configurable computing resources for the workload. In response, the set of resource attributes is communicated (e.g., to be utilized to configure the shared pool of configurable computing resources for the workload).

In embodiments, the registry receives or stores the set of workload resource data. The registry may include a public access feature (e.g., public registry). The registry can have a nonpublic access feature (e.g., nonpublic/private registry). In embodiments, an interface may be presented to provide the registry with a set of scaling factor descriptions and a set of workload resource data for a registered workload. In addition, embodiments may provide an interface to receive a set of resource attributes for a provided set of scaling factor values for a workload. Altogether, performance or efficiency benefits when managing a shared pool of configurable computing resources may occur (e.g., speed, flexibility, responsiveness, resource usage). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
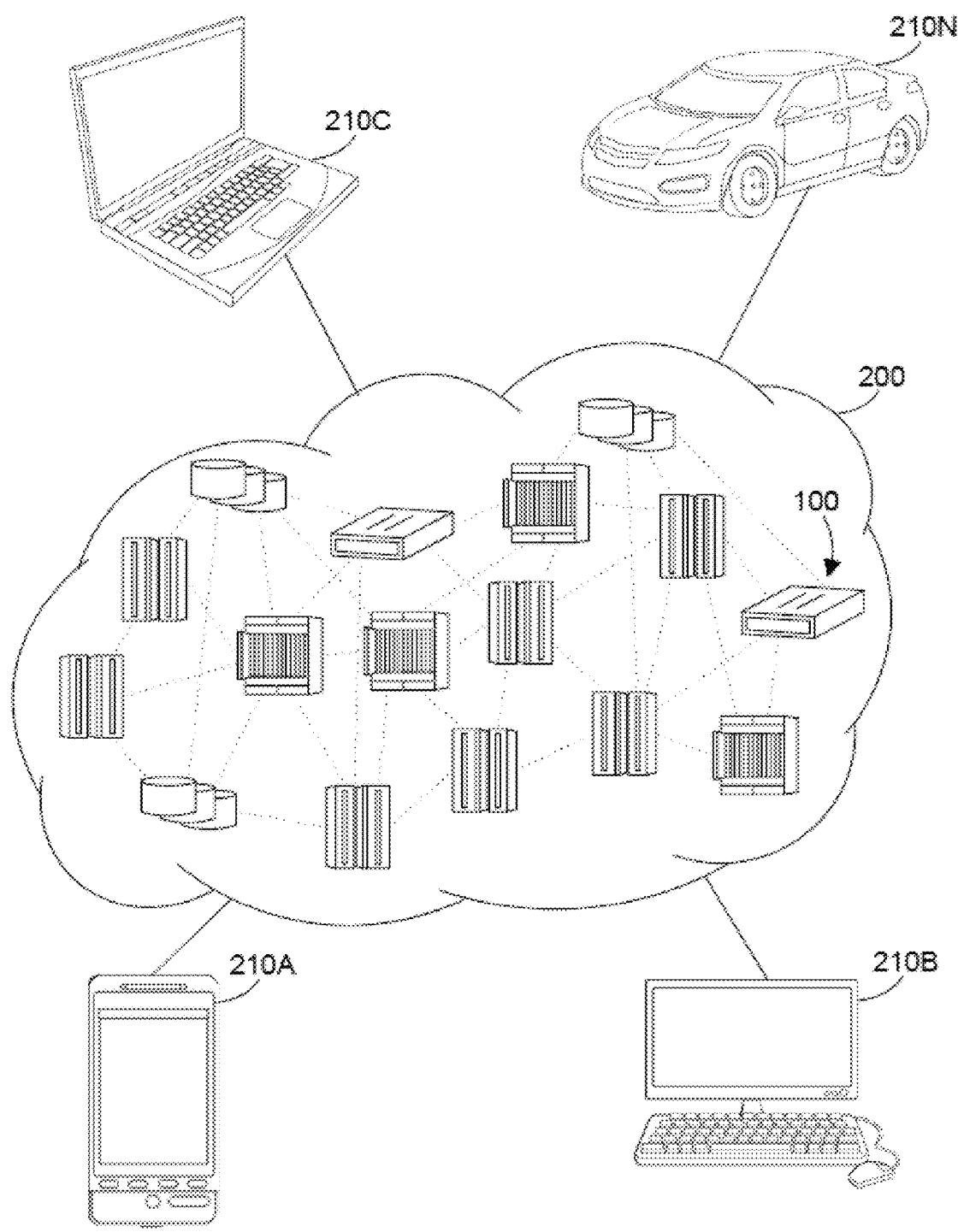
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
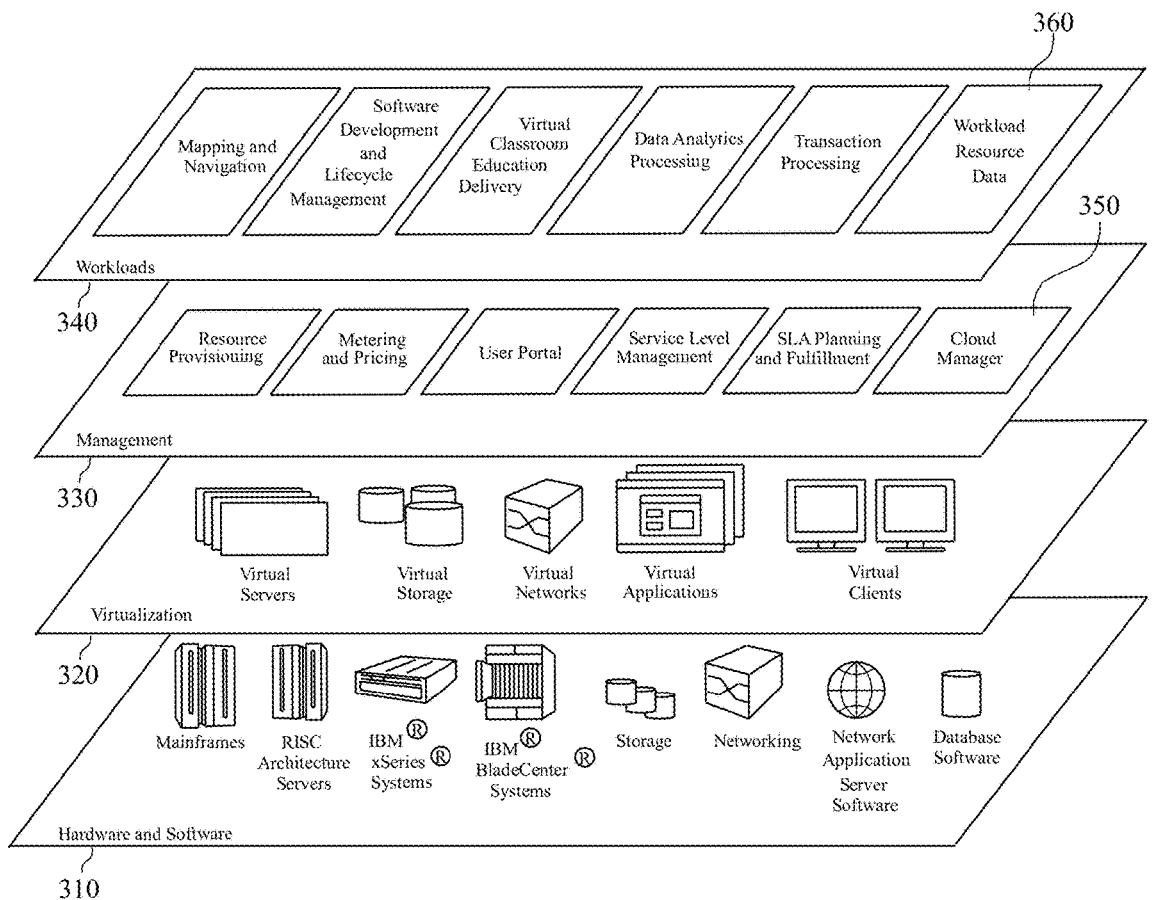
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a set of workload resource data 360, which may be used as discussed in more detail below.

Figure 4:
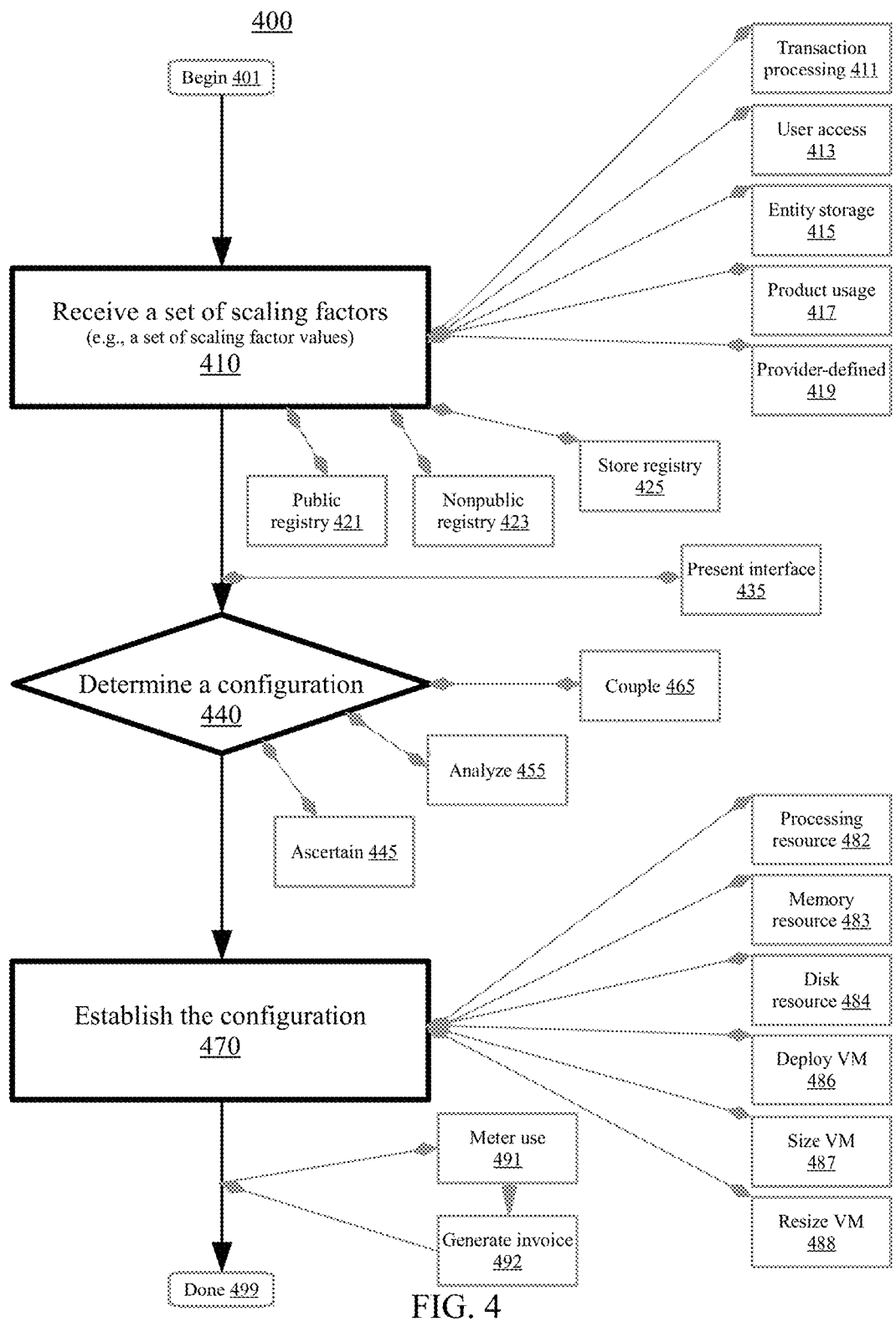
FIG. 4 is a flowchart illustrating a method of managing a shared pool of configurable computing resources associated with a shared pool manager according to embodiments.

FIG. 4 is a flowchart illustrating a method 400 of managing a shared pool of configurable computing resources associated with a shared pool manager according to embodiments. The shared pool of configurable computing resources may utilize the shared pool manager (e.g., a controller, a cloud manager) to execute/carry-out processes/tasks. For example, when deploying virtual machines in a cloud environment (e.g., public, private, hybrid), cloud administrators or users specify resource requirements (e.g., number of virtual processors, amount of memory, disk space) for the virtual machines based on requirements for the workload and the scale which is planned to be run. The shared pool manager may or may not be included in the shared pool of configurable computing resources. Method 400 may begin at block 401.

At block 410, a set of scaling factors is received (e.g., by the shared pool manager). The set of scaling factors corresponds to a workload. The workload may include an instantiation of one or more images (e.g., a type/version of software to be run). The set of scaling factors and values may be received from a user (e.g., as an input). The user can include a customer of cloud services (e.g., a corporate chief information officer). For instance, an administrator-customer may calculate the set of scaling factors by analyzing expected usage data/statistics with respect to the workload and subsequently transmit the set of scaling factors to the shared pool manager.

For instance, the set of scaling factors influencing resource requirements can include the number of transactions being processed, the number of users accessing the system, the number of entities being stored, etc. In embodiments, the set of scaling factors can include a transaction processing scaling-factor-value 411 (e.g., number of transactions), a user access scaling-factor-value 413 (e.g., number of users), an entity storage scaling-factor-value 415 (e.g., number of objects for storage), a product usage scaling-factor-value 417 (e.g., number of entities being accessed/managed), or a provider-defined scaling-factor-value 419 (e.g., user's scaling goals for the workload). For example, the transaction processing scaling-factor-value 411 may include 500 total transactions, 400 transactions per day, or twelve-hours of transactions. For instance, the user access scaling-factor-value 413 may include 100 total users, 45 current/active users, or 16 user-groups. Other possibilities related to the set of scaling factors are considered and contemplated.

In embodiments, an interface (e.g., a programmatic graphical user interface) is presented at block 435 to receive the set of scaling factor values (e.g., in response to prompting the user). In embodiments, an interface to receive a set of workload resource data may also be provided. For example, applications/virtual appliance vendors may provide the set of workload resource data (e.g., information in the form of documentation or sizing tools) to be used with respect to resource requirements given some set of scaling factor values. In an alternative embodiment, the set of workload data may be included/stored in a registry (e.g., as part of the shared pool of configurable computing resources) at block 425. The registry may be a public registry at block 421 (e.g., a publicly available database of templates/flavors defining one or more resource configurations). The registry may be a nonpublic registry at block 423 (e.g., a privately held database of templates/flavors defining one or more resource configurations).

At block 440, a configuration for the shared pool of configurable computing resources is determined. The configuration is determined using the set of scaling factor values and a set of workload resource data. The set of workload resource data may include information received from a workload provider (e.g., company who designed software to execute such workloads). In various embodiments, the set of workload resource data may indicate or map-to one or more configurations (e.g., based on one or more parameters/inputs such as the set of scaling factors). In certain embodiments, the configuration may be dynamically computed to resolve a flavor which specifies a size of a virtual machine for a type of workload and scale intended to be run/executed/processed.

For example, for a virtual machine deploy/resize operation, the shared pool manager may associate a virtual machine image or deploy operation (e.g., using the set of scaling factors and other workload properties) with a workload identifier indicated in the set of workload data. The workload identifier can be associated with a configuration template/flavor and specified on the deploy interfaces. To illustrate, the set of scaling factor values may include 950 expected transactions per day which can be accessed by 35 users. The set of workload data may indicate that for 900 to 1000 expected transactions per day which can be accessed by 20 to 50 users the appropriate configuration is identified as the flavor "2P-8M" which includes two processors and eight gigabytes of memory.

In embodiments, determining the configuration includes ascertaining a set of resource attributes which indicates the configuration at block 445. Ascertaining the set of resource attributes can include determining/computing processing, memory, or disk types/features. For instance, various algorithms may be utilized which account for the set of scaling factors. For certain workloads, a particular resource attribute such as memory may be prioritized with respect to another such processing power. For example, the set of resource attributes may be pulled from the registry by the shared pool manager to identify an appropriate configuration.

In embodiments, using the set of scaling factor values and the set of workload resource data includes analyzing the set of scaling factor values with respect to the set of workload resource data at block 455. For instance, analyzing can include extracting (e.g., creating a derivation), examining (e.g., performing an inspection), evaluating (e.g., generating an appraisal), dissecting (e.g., scrutinizing an attribute), resolving (e.g., ascertaining an observation/conclusion/answer), parsing (e.g., deciphering a construct), comparing (e.g., relating an assessment), classifying (e.g., assigning a designation), or categorizing (e.g., organizing by a feature). In various embodiments, analyzing may include using a workload estimator tool which can define resource requirements or partition configurations. Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished, a configuration for implementation) for further use.

In embodiments, a workload identifier is coupled with a configuration flavor at block 465 (e.g., to form a couplet in a data store). The workload identifier can include a unique name, numeric, or other identifier for the workload within the shared pool or more globally. The configuration flavor can include an arrangement, organization, design, feature, component, or other aspect of one or more resources. The workload identifier and the configuration flavor may be coupled/connected/linked for efficiency in processing the determination of the configuration to be used. For example, certain couplets may be predetermined or computed in advance (e.g., the workload provided may have selected a configuration flavor based on how the workload was designed or for its intended usage). Other couplets may be based on machine learning or historical usage.

At block 470, the configuration of the shared pool of configurable computing resources is established (e.g., created, generated). The configuration can be established to process the workload (e.g., using one or more generated/resized virtual machines). In embodiments, establishing the configuration of the shared pool of configurable computing resources includes providing a processing resource at block 482 (e.g., 5 type A processors), providing a memory resource at block 483 (e.g., 2 gigabytes of type D memory), providing a disk resource at block 484 (e.g., 8 type H disk drives having 500 total gigabytes of storage), deploying a virtual machine at block 486, sizing the virtual machine at block 487, or resizing the virtual machine at block 488. In certain embodiments, use of the configuration of the shared pool of configurable computing resources can be metered at block 491 and an invoice can be generated based on the metered use at block 492.

Method 400 concludes at block 499. Aspects of method 400 may provide performance or efficiency benefits for managing a shared pool of configurable computing resources. For example, aspects of method 400 may have positive impacts with respect to sizing one or more virtual machines. Altogether, performance or efficiency benefits when managing a shared pool of configurable computing resources may occur (e.g., speed, flexibility, responsiveness, resource usage).

Figure 5:
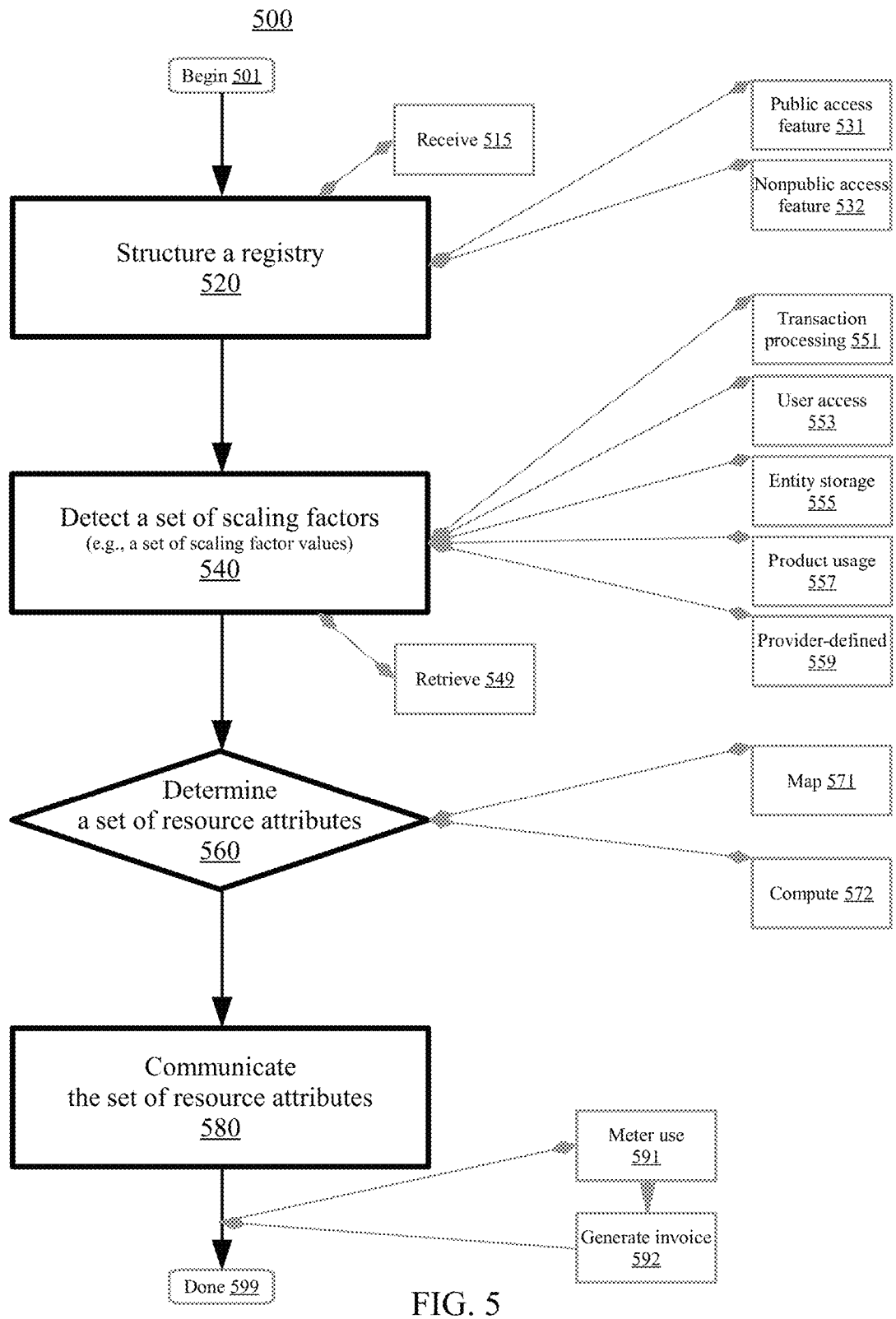
FIG. 5 is a flowchart illustrating a method of managing a shared pool of configurable computing resources associated with a registry according to embodiments.

FIG. 5 is a flowchart illustrating a method 500 of managing a shared pool of configurable computing resources associated with a registry according to embodiments. The shared pool of configurable computing resources may utilize the registry (e.g., a database) to store information. For example, the registry can provide a programmatic interface for a supplier to register workload identifiers and supply their resource requirements based on scaling factors. Also, the registry can provide an interface to receive scaling factors values for a given workload and compute the resource requirements for a workload in response to having the scaling factor values. The registry may or may not be included in the shared pool of configurable computing resources. Method 500 may begin at block 501.

At block 520, the registry is structured to have a set of workload resource data and associated scaling factors. In embodiments, the registry receives the set of workload resource data and associated scaling factors at block 515. The registry may include a public access feature at block 531 (e.g., a public registry). Public registries may be hosted to allow third-party application, appliance, or operating system providers to register their workload resource requirements. Public registries may have public interfaces so cloud management software (e.g., shared pool managers) managing public, private, or hybrid clouds can access the set of workload resource data. The registry may include a non-public access feature at block 532 (e.g., a nonpublic/private registry). Private registries may be hosted by/within an enterprise for enterprise specific workload registration. As such, private registries may be used by/within private or hybrid clouds.

At block 540, a set of scaling factor values is detected (e.g., sensed). The set of scaling factor values corresponds to a workload. In embodiments, detecting the set of scaling factor values includes receiving the set of scaling factor values (e.g., from a user, from a shared pool manager). In embodiments, the set of scaling factor values can include a transaction processing scaling-factor-value 551, a user access scaling-factor-value 553, an entity storage scaling-factor-value 555, a product usage scaling-factor-value 557, or a provider-defined scaling-factor-value 559. In various embodiments, scaling factors may be retrieved at block 549. For example, the shared pool manager may get the scaling factors (e.g., transaction rate) and present them to the user so that the user can supply the scaling factor value (e.g., 500).

At block 560, based on both the set of workload resource data and the set of scaling factor values, a set of resource attributes is determined (to configure the shared pool of configurable computing resources for the workload). The set of resource attributes can include a processing component, a memory component, or a disk component (e.g., types, quantities, sizes, properties). In various example embodiments, affinity/anti-affinity properties returned from a registry query for a workload identifier can return rules referencing other workload identifiers. A shared pool manager may use these rules to define its policies and filters in its placement logic. In certain example embodiments, storage types returned from the registry for a workload identifier can return information such as the required storage attachment technology (e.g. N-Port ID Virtualization (NPIV), Internet Small Computer System Interface (iSCSI)), number of paths to storage for redundancy and throughput, or Input/Output Operations Per Second (IOPS). Accordingly, determining the set of resource attributes can include calculating/computing resource requirement(s).

In embodiments, determining the set of resource attributes includes mapping a scaling-factor-value with a resource at block 571. The resource can include a specific processing resource, a specific memory resource, or a specific disk resource (e.g., a specific type, a specific quantity, a specific size, a group of specific properties). For example, the registry may store mappings of ranges to requirements (e.g., 1-500 transactions maps to 1 processor and 4 gigabytes of memory, 501-1000 transactions maps to 2 processors and 8 gigabytes of memory).

In embodiments, determining the set of resource attributes includes computing the set of resource attributes utilizing a workload estimator at block 572. For example, the registry can utilize sizing logic which plugs-in to a framework of the registry. To illustrate, using the framework, one or more framework plug-ins may interface in a programmatic manner to a workload estimator tool to resolve scaling factors or obtain estimates based on values for a plurality of different scaling factors.

At block 580, the set of resource attributes is communicated (e.g., to configure the shared pool of configurable computing resources for the workload). Communicating can include transmitting, publishing, routing, sending, presenting, displaying, or outputting. The communication may be to a user, the shared pool manager, or directly to configure the shared pool of configurable computing resources (e.g., via a data packet which may be specially designed). In certain embodiments, use of the registry can be metered at block 591 and an invoice can be generated based on the metered use at block 592.

Method 500 concludes at block 599. Aspects of method 500 may provide performance or efficiency benefits for managing a shared pool of configurable computing resources. For example, aspects of method 500 may include positive impacts with respect to virtual machine properties and placement. Altogether, performance or efficiency benefits when managing a shared pool of configurable computing resources may occur (e.g., speed, flexibility, responsiveness, resource usage).

Figure 6:
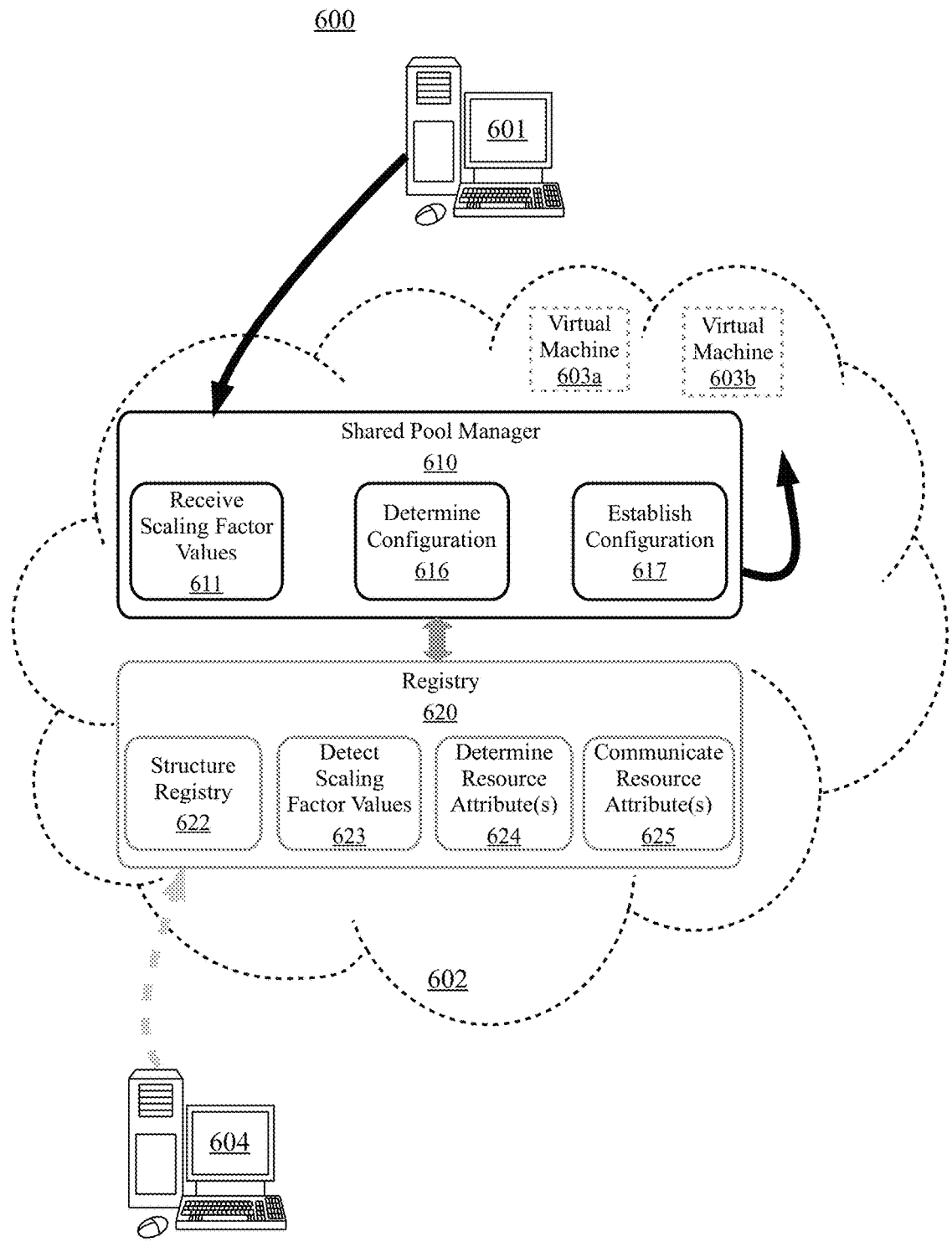
FIG. 6 shows an example system for managing a shared pool of configurable computing resources according to embodiments.

FIG. 6 shows an example system 600 for managing a shared pool of configurable computing resources according to embodiments. In embodiments, method 400 may be implemented in a shared pool manager 610. In embodiments, method 500 may be implemented in a registry 620. As such, aspects of the discussion related to FIG. 4, FIG. 5, method 400, and method 500 may be used/applied/implemented in the system 600. Components depicted in FIG. 6 need not be present, utilized, or located as such in every such similar system, and such components are presented as an illustrative example. Aspects of system 600 may be implemented in hardware, software or firmware executable on hardware, or a combination thereof. The shared pool of configurable computing resources (e.g., cloud environment 602) can include (but need not include) the shared pool manager 610 or the registry 620. Virtual machines 603a and 603b may be established (as part of the cloud environment 602) using the system 600 and the methodologies described herein. The virtual machines can cooperate to provide a computing capability (e.g., store data using memory, process data using a processor). Of course, system 600 could include many other features or functions known in the art that are not shown in FIG. 6.

Shared pool manager 610 can include a module to receive scaling factors and values 611 (see discussion with respect to block 410 of FIG. 4), a module to determine the configuration 616 (see discussion with respect to block 440 of FIG. 4), and a module to establish the configuration 617 (see discussion with respect to block 470 of FIG. 4). Registry 620 can include a module to structure the registry 622 (see discussion with respect to block 520 of FIG. 5), a module to detect scaling factor(s) 623 (see discussion with respect to block 540 of FIG. 5), a module to determine resource attribute(s) 624 (see discussion with respect to block 560 of FIG. 5), and a module to communicate resource attribute(s) 625 (see discussion with respect to block 580 of FIG. 5). Other aspects described herein may also be included (e.g., the shared pool manager 610 may include other aspects described with respect to FIG. 4, the registry 620 may include other aspects described with respect to FIG. 5, crossover between aspects of the shared pool manager 610 and the registry 620 can occur).

The module to structure the registry 622 may receive a set of workload resource data from a workload provider 604. The module to receive scaling factor(s) 611 may receive a set of scaling factor values from a user 601. In response to receiving the set of scaling factor values, shared pool manager 610 may pass such information to the registry 620. The registry 620 may use its modules to process the information and ultimately communicate resource attribute(s) back to the shared pool manager 610. Once the configuration is determined, the configuration may be established. As such, cloud environment 602 may be provided with processing/memory/disk resources or virtual machines 603a and 603b may be deployed/sized/resized. In embodiments, the establishing the configuration may include presenting the configuration to the user 601 (e.g., prior to providing resources).

Consider the following illustrative example. A workload provider registers a workload identifier, its scaling factors, and resource requirements based on scaling factors. A cloud management administrator registers the workload identifier with a flavor (or the flavor is dynamically determined). A user requests to create a virtual machine for a flavor having a specific workload. A shared pool manager gets scaling factors for workload from the registry. The shared pool manager gets values for the scaling factors from the user. The shared pool manager gets resource requirements from the registry given the scaling factor values and workload. The shared pool manager uses returned resource requirements in creating the appropriately sized virtual machine.

Aspects of system 600 may provide performance or efficiency benefits when managing a shared pool of configurable computing resources. For example, aspects of system 600 may save resources such as bandwidth, processing, or memory (e.g., properly sized virtual machines). Altogether, a shared pool of configurable computing resources may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system of managing a shared pool of configurable computing resources associated with a shared pool manager, the system comprising:
   a memory having a set of computer readable computer instructions, and
   a processor for executing the set of computer readable instructions, the set of computer readable instructions including:
   receiving, by the shared pool manager, a set of scaling factor values which corresponds to a workload and a set of workload resource data,
   wherein the set of scaling factor values comprises one or more of a transaction processing scaling-factor-value, a user access scaling-factor-value, an entity storage scaling-factor-value, a product usage scaling-factor-value, and a provider-defined scaling-factor-value,
   wherein the workload resource data includes a plurality of configurations, each configuration specifying a different virtual machine size and resource requirement type for the workload, and
   wherein the workload is to be executed by a virtual machine;
   analyzing the set of scaling factor values with respect to the set of workload resource data to extract patterns to determine resource requirements for the workload;
   dynamically determining, based upon the extracted patterns, a configuration of the plurality of configurations for configuring the virtual machine to an appropriate size with the resource requirement types for processing the workload;
   establishing, based upon the determined configuration, the shared pool of configurable computing resources including the virtual machine which has the appropriate size; and
   processing, using the virtual machine which has the appropriate size, the workload.

2. The system of claim 1, wherein a public registry includes the set of workload resource data.

3. The system of claim 1, wherein a nonpublic registry includes the set of workload resource data.

4. The system of claim 1, further comprising storing, in the shared pool of configurable computing resources, a registry having the set of workload resource data.

5. The system of claim 1, wherein determining the configuration for the virtual machine includes:
   coupling a workload identifier with a configuration flavor.

6. The system of claim 1, wherein establishing the shared pool of configurable computing resources includes a selection from a group consisting of at least one of:
   providing a processing resource,
   providing a memory resource,
   providing a disk resource,
   deploying a virtual machine,
   sizing the virtual machine, or
   resizing the virtual machine.

7. The system of claim 1, further comprising:
   presenting, to a user, an interface to receive the set of scaling factor values; and
   receiving, from the user, the set of scaling factor values.

8. A computer program product of managing a shared pool of configurable computing resources associated with a shared pool manager, the computer program product comprising a computer readable storage medium having program instructions embodied therewith, wherein the computer readable storage medium is not a transitory signal, the program instructions executable by a processor to cause the processor to perform a method comprising:
   receiving, by the shared pool manager, a set of scaling factor values which corresponds to a workload and a set of workload resource data,
   wherein the set of scaling factor values comprises one or more of a transaction processing scaling-factor-value, a user access scaling-factor-value, an entity storage scaling-factor-value, a product usage scaling-factor-value, and a provider-defined scaling-factor-value, wherein the workload resource data includes a plurality of configurations, each configuration specifying a different virtual machine size and resource requirement type for the workload, and wherein the workload is to be executed by a virtual machine;

analyzing the set of scaling factor values with respect to the set of workload resource data to extract patterns to determine resource requirements for the workload;

dynamically determining, based upon the extracted patterns, a configuration of the plurality of configurations for configuring the virtual machine to an appropriate size with the resource requirement types for processing the workload;

establishing, based upon the determined configuration, the shared pool of configurable computing resources including the virtual machine which has the appropriate size; and processing, using the virtual machine which has the appropriate size, the workload.

* * * * *